(12) United States Patent
Hatada (10) Patent No.: US 8,574,775 B2
(45) Date of Patent: Nov. 5, 2013

(54) FUEL CELL SYSTEM AND METHOD FOR STARTING UP THE SAME

(75) Inventor: Susumu Hatada, Kanagawa (JP)

(73) Assignee: Nippon Oil Corporation (JP)

( * ) Notice: Subject to any disclaimer, the term of this patent is extended or adjusted under 35 U.S.C. 154(b) by 519 days.

(21) Appl. No.: 12/675,161

(22) PCT Filed: Aug. 11, 2008

(86) PCT No.: PCT/JP2008/064430
§ 371 (c)(1),
(2), (4) Date: Aug. 17, 2010

(87) PCT Pub. No.: WO2009/028327
PCT Pub. Date: Mar. 5, 2009

(65) Prior Publication Data
US 2010/0310951 A1 Dec. 9, 2010

(30) Foreign Application Priority Data
Aug. 29, 2007 (JP) .................................. 2007-222464

(51) Int. Cl.
*H01M 8/06* (2006.01)
(52) U.S. Cl.
USPC ........................................................... 429/423
(58) Field of Classification Search
USPC ........................................................... 429/423
See application file for complete search history.

(56) References Cited

U.S. PATENT DOCUMENTS

2005/0208664 A1* 9/2005 Keegan et al. .................. 436/55

FOREIGN PATENT DOCUMENTS

| JP | 6-231792 | A | 8/1994 |
| JP | 2002-201002 | A | 7/2002 |
| JP | 2004-75403 | A | 3/2004 |
| JP | 2004-319420 | A | 11/2004 |
| JP | 2006-190605 | A | 7/2006 |
| JP | 2007-73302 | A | 3/2007 |
| WO | 2008153011 | A1 | 12/2008 |

OTHER PUBLICATIONS

Stambouli, A. Boudghene, E. Traversa, "Solid oxide fuel cells (SOFCs): a review of an environmentally clean and efficient source of energy", Renewable and Sustainable Energy Reviews, 6 (2002) pp. 433-455.*
English Abstract and English Machine Translation of Takeda et al. (JP 2002-201002) (2002).*
Rejection Notice of Japanese Patent Application No. 2007-222464, dispatched Jul. 17, 2012, with partial English translation.
International Search Report for International application No. PCT/JP2008/064430 with English translation mailed Nov. 11, 2008.
Extended European Search Report for Application No. 08828710.7; Date of Mailing: Aug. 13, 2013; 6 pages.

* cited by examiner

Primary Examiner — Jessee Roe
(74) Attorney, Agent, or Firm — Cantor Colburn LLP (57) ABSTRACT

A method for starting a fuel cell system may include raising the temperature of the reforming catalyst layer while measuring the temperature of the reforming catalyst layer, calculating the flow rate of a hydrocarbon fuel which can be reformed in the reforming catalyst layer based on the measured temperature of the reforming catalyst layer, and supplying the hydrocarbon fuel at the calculated flow rate into the reforming catalyst layer to reform the fuel, and supplying the resultant reformed gas into an anode of a high temperature-type fuel cell. The amount of the hydrocarbon fuel supplied into the reforming catalyst layer is increased until the amount of the hydrocarbon fuel supplied into the reforming catalyst layer reaches the flow rate at the time of the completion of the start.

9 Claims, 4 Drawing Sheets

FUEL CELL SYSTEM AND METHOD FOR STARTING UP THE SAME

This is a U.S. national stage application of International Application No. PCT/JP2008/064430, filed on 11 Aug. 2008. Priority under 35 U.S.C. §119(a) and 35 U.S.C. §365(b) is claimed from Japanese Application No. JP2007-222464, filed 29 Aug. 2007, the disclosure of which is also incorporated herein by reference.

TECHNICAL FIELD

The present invention relates to a fuel cell system that generates electric power using a reformed gas obtained by reforming a hydrocarbon-based fuel, such as kerosene, and a method for starting up the same.

BACKGROUND ART

A solid oxide fuel cell (hereinafter sometimes referred to as SOFC) system usually includes a reformer for reforming a hydrocarbon-based fuel, such as kerosene and town gas, to generate a hydrogen-containing gas (reformed gas), and an SOFC for electrochemically reacting the reformed gas and air for electric power generation.

The SOFC is usually operated at a high temperature of 550 to 1000° C.

Various reactions, such as steam reforming (SR), partial oxidation reforming (POX), and autothermal reforming (ATR), are used for reforming, and heating to a temperature at which catalytic activity is exhibited is necessary for using a reforming catalyst.

Accordingly, the temperature of both the reformer and the SOFC should be increased at start-up. Patent Document 1 describes a method for starting up an SOFC system, in which the SOFC system that performs steam reforming can be efficiently performed in a short time.

Steam reforming is a very large endothermic reaction. Also, the reaction temperature of the steam reforming is 550 to 750° C., which is relatively high, and the steam reforming requires a high temperature heat source. Therefore, an internal reforming SOFC is known in which a reformer (internal reformer) is installed near an SOFC, and the reformer is heated mainly using radiant heat from the SOFC as a heat source (Patent Document 2).
Patent Document 1: JP2006-190605A
Patent Document 2: JP2004-319420A

DISCLOSURE OF THE INVENTION

Problems to be Solved by the Invention

Generally, when the temperature of an SOFC is increased to its operating temperature at the start-up of an SOFC system, a reducing gas, such as hydrogen, is beforehand made to flow through the anode to prevent the oxidative degradation of the anode of the cell.

As a hydrogen supply source during the increase of temperature, various ones, such as a hydrogen gas bomb, hydrogen-storing, -adsorbing and -generating materials, and electrolytic hydrogen, are considered. But, considering widespreading of the system for consumer use, the supply source is desirably a reformed gas obtained from a fuel.

When a fuel is reformed by a reformer during start-up, and the obtained reformed gas is supplied to an SOFC to prevent the degradation of the anode, for example, in the case of an indirect internal reforming SOFC, the SOFC is also simultaneously heated by heat transfer from the internal reformer. As a result, the anode is increased to the oxidative degradation temperature or higher, and when the anode is in an atmosphere of an oxidizing gas, for example, air or steam, the anode may be oxidatively degraded. Therefore, it is desired to produce the reformed gas from a stage as early as possible.

On the other hand, when a hydrocarbon-based fuel is not reformed to a predetermined composition, and an unreformed component is supplied to the SOFC, flow blockage due to carbon deposition and anode degradation may occur, particularly when a heavy hydrocarbon, such as kerosene, is used as the hydrocarbon-based fuel. Therefore, even during start-up, a method for reliably performing reforming is necessary.

Accordingly, while it is desired to produce the reformed gas from a stage as early as possible during start-up, it is desired to reliably perform reforming. This is true not only for the SOFC, but also for a fuel cell system having a high temperature fuel cell, such as a molten carbonate fuel cell (MCFC).

It is an object of the present invention to provide a method for starting up a fuel cell system including a reformer having a reforming catalyst layer and a high temperature fuel cell, in which reforming can be reliably performed from an early stage to more reliably prevent the oxidative degradation of the anode.

It is another object of the present invention to provide a fuel cell system preferred for performing such a method.

Means for Solving the Problems

The present invention provides the following method and apparatus.

(1) A method for starting up a fuel cell system including a reformer having a reforming catalyst layer, for reforming a hydrocarbon-based fuel to produce a hydrogen-containing gas, and a high temperature fuel cell for generating electric power using the hydrogen-containing gas, including:

a) increasing a temperature of the reforming catalyst layer, while measuring the temperature of the reforming catalyst layer;

b) calculating a flow rate of the hydrocarbon-based fuel that can be reformed in the reforming catalyst layer, based on the measured temperature of the reforming catalyst layer; and c) supplying the hydrocarbon-based fuel at the calculated flow rate to the reforming catalyst layer to reform the hydrocarbon-based fuel, and supplying the obtained reformed gas to the anode of the high temperature fuel cell, wherein a feed rate of the hydrocarbon-based fuel supplied to the reforming catalyst layer is increased, while steps b and c are repeated, until the feed rate of the hydrocarbon-based fuel supplied to the reforming catalyst layer becomes a flow rate at completion of start-up.

(2) The method according to (1), further including d) supplying steam and/or an oxygen-containing gas at a flow rate required for the reforming performed in step c to the reforming catalyst layer prior to step c.

(3) The method according to (1) or (2), wherein as the reforming catalyst layer, a reforming catalyst layer that can promote a steam reforming reaction is used, and steam reforming is performed when the hydrocarbon-based fuel at the flow rate at the completion of start-up is reformed.

(4) The method according to (3), wherein as the reforming catalyst layer, a reforming catalyst layer that can promote a steam reforming reaction and a partial oxidation reforming reaction is used, and partial oxidation reforming or autothermal reforming is performed when the hydrocarbon-based fuel at a flow rate lower than the flow rate at the completion of start-up is reformed.

(5) The method according to any one of (1) to (4),
wherein as the reforming catalyst layer, a reforming catalyst layer that can promote combustion is used, and
in step a,
e) supplying the hydrocarbon-based fuel to the reforming catalyst layer to combust the hydrocarbon-based fuel is performed.

(6) The method according to (5), further including
f) calculating the flow rate of the hydrocarbon-based fuel that can be combusted in the reforming catalyst layer, based on the measured temperature of the reforming catalyst layer, prior to step e.

(7) The method according to (6), further including
g) supplying an oxygen-containing gas at a flow rate required for the combustion performed in step e to the reforming catalyst layer prior to step e.

(8) The method according to any one of (1) to (5),
wherein a plurality of divided regions into which the reforming catalyst layer is divided along a gas flow direction are considered,
in step a, temperatures at a plurality of points in the reforming catalyst layer at different positions along the gas flow direction are measured, and
in step b, one or more flow rates of the hydrocarbon-based fuel that can be reformed in one or more of the plurality of divided regions are calculated, based on the temperatures at the plurality of points, and the total value of the calculated flow rate(s) is determined as said flow rate of the hydrocarbon-based fuel that can be reformed in the reforming catalyst layer.

(9) A fuel cell system including:
a reformer having a reforming catalyst layer, for reforming a hydrocarbon-based fuel to produce a hydrogen-containing gas;
a high temperature fuel cell for generating electric power using the hydrogen-containing gas;
a reforming catalyst layer temperature measuring means for measuring the temperature of the reforming catalyst layer;
a reforming catalyst layer temperature increasing means for increasing the temperature of the reforming catalyst layer; and
a control means having a fuel flow rate calculating function for calculating a flow rate of the hydrocarbon-based fuel that can be reformed in the reforming catalyst layer, based on the measured temperature of the reforming catalyst layer, and a fuel flow rate controlling function for controlling the hydrocarbon-based fuel supplied to the reforming catalyst layer to flow at the calculated flow rate, and being able to increase a feed rate of the hydrocarbon-based fuel to the reforming catalyst layer, while repeatedly operating the fuel flow rate calculating function and the fuel flow rate controlling function, until the feed rate of the hydrocarbon-based fuel to the reforming catalyst layer becomes a flow rate at completion of start-up.

Advantages of the Invention

The present invention provides a method for starting up a fuel cell system including a reformer having a reforming catalyst layer, and a high temperature fuel cell, in which reforming can be reliably performed from an early stage to more reliably prevent the oxidative degradation of the anode.

The present invention provides a fuel cell system preferred for performing such a method.

DESCRIPTION OF SYMBOLS 1 water vaporizer
2 electrical heater annexed to water vaporizer
3 reformer
4 reforming catalyst layer
5 thermocouple
6 SOFC
7 igniter
8 module container
9 electrical heater annexed to reformer
10 computer
11 flow rate control valve
12 flowmeter

BEST MODE FOR CARRYING OUT THE INVENTION

A fuel cell system used in the present invention includes a reformer for reforming a hydrocarbon-based fuel to produce a hydrogen-containing gas, and a high temperature fuel cell. The reformer includes a reforming catalyst layer. The high temperature fuel cell generates electric power, using the hydrogen-containing gas obtained from the reformer. The reforming catalyst layer is composed of a reforming catalyst that can promote a reforming reaction. The hydrogen-containing gas obtained from the reformer is referred to as a reformed gas.

[Step a]

When the fuel cell system is actually started up, step a is performed. In other words, the temperature of the reforming catalyst layer is increased, while the temperature of the reforming catalyst layer is measured. The temperature measurement and the temperature increase by the step a are continued until the completion of start-up.

For example, an electrical heater provided in the reformer may be used as a heat source for this temperature increase.

Also, the temperature of the reforming catalyst layer may be increased by letting a high temperature fluid flow through the reforming catalyst layer. For example, steam and/or air required for reforming may be preheated as required and supplied. An electrical heater or a combustor, such as a burner, may be used as a heat source for this preheating. Alternatively, when a high temperature fluid is supplied from outside the fuel cell system, the fluid may be a heat source for the above-described preheating.

Alternatively, when the reforming catalyst layer can promote combustion, the temperature of the reforming catalyst layer may be increased by combusting the hydrocarbon-based fuel in the reforming catalyst layer. The combustion gas is an oxidizing gas. Therefore, in terms of preventing the fuel cell from being degraded by the combustion gas flowing through the fuel cell, combustion is performed in the reforming catalyst layer when the fuel cell is at a temperature at which the fuel cell is not degraded even if the combustion gas flows through the fuel cell. For achieving this, the temperature of the fuel cell, particularly the temperature of the anode electrode, is monitored, and when the temperature becomes a temperature at which degradation may occur, the above combustion may be stopped.

Further, after the reformed gas is produced, the temperature of the reforming catalyst layer may be increased using combustion heat generated by combusting the reformed gas.

Also, when heat is generated by reforming, after the reforming is started, the temperature of the reforming catalyst layer may be increased by the heat generation. When partial oxidation reforming is performed, or when heat generation by a partial oxidation reforming reaction is larger than endothermic heat by a steam reforming reaction in autothermal reforming, heat is generated by the reforming.

Also, the above-described temperature increasing methods may be appropriately used in combination, or may be separately used depending on the situation.

[Steps b and c]

After the increase of the temperature of the reforming catalyst layer is started, or from a point of time when the increase of the temperature of the reforming catalyst layer is started, steps b and c are repeatedly performed. The feed rate of the hydrocarbon-based fuel to the reforming catalyst layer is increased, while the steps b and c are repeated, until the feed rate of the hydrocarbon-based fuel to the reforming catalyst layer becomes a flow rate at the completion of start-up.

At a low temperature, the flow rate calculated by the step b may be zero. In this case, the flow rate of the hydrocarbon-based fuel flow rate supplied to the reforming catalyst layer is zero, and the flow rate of the reformed gas is also zero. In other words, the supply of the hydrocarbon-based fuel to the reforming catalyst layer in the step c is not performed, and therefore, the supply of the reformed gas to the anode of the high temperature fuel cell is also not performed.

As the temperature increases, the reforming activity of the catalyst begins to be exhibited, and the hydrocarbon-based fuel at a relatively low flow rate can be reformed. In other words, the hydrocarbon-based fuel at a flow rate exceeding zero is calculated in the step b. When the hydrocarbon-based fuel (a flow rate other than zero) is supplied to the reforming catalyst layer for the first time by the step c, the flow rate is a flow rate lower than the hydrocarbon-based fuel flow rate at the completion of start-up. In the last-time step c in start-up operation, the hydrocarbon-based fuel at the hydrocarbon-based fuel flow rate at the completion of start-up is supplied to the reforming catalyst layer.

In this manner, first, the hydrocarbon-based fuel at a relatively low flow rate is reformed to generate the reformed gas, in the present invention. In other words, the amount of reforming is increased during start-up. Lower temperature is enough to reform the hydrocarbon-based fuel at a lower flow rate. Therefore, a reducing gas (reformed gas) can be produced from a point of time when the temperature increase does not proceed much, that is, from a relatively early stage of start-up. By supplying this reducing gas to the anode of the fuel cell, it becomes possible to prevent the degradation of the anode from an early stage.

Step d may be performed prior to the step c. In other words, steam and/or an oxygen-containing gas at a flow rate required for reforming the hydrocarbon-based fuel which is to be made to flow in the step c may be supplied to the reforming catalyst layer, prior to step c. When repeating the steps b and c, after the feed rate of the hydrocarbon-based fuel to the reforming catalyst layer is calculated in the step b, the step d may be performed to beforehand supply to the reforming catalyst layer the steam and/or the oxygen-containing gas at a flow rate required for reforming the hydrocarbon-based fuel at a flow rate which is to be supplied in the next step c. Due to the step d, the hydrocarbon-based fuel supplied in the step c can be more reliably reformed. However, this is not limiting, and the steam and/or the oxygen-containing gas at the flow rate required in the step c may be supplied simultaneously with the step c.

When a steam reforming reaction is performed, that is, steam reforming or autothermal reforming is performed, steam is supplied to the reforming catalyst layer. When a partial oxidation reforming reaction is performed, that is, partial oxidation reforming or autothermal reforming is performed, an oxygen-containing gas is supplied to the reforming catalyst layer. As the oxygen-containing gas, a gas containing oxygen may be appropriately used, but in terms of the ease of availability, air is preferred.

In the present invention, reforming is gradually performed, and it is not always necessary to continuously perform the same type of reforming. For example, it is possible to perform autothermal reforming at an initial stage and perform steam reforming from midstream. Also, it is possible to perform partial oxidation reforming at an initial stage, switch to autothermal reforming in midstream, and further switch to steam reforming. Alternatively, it is also possible to continuously perform only steam reforming, to continuously perform only autothermal reforming, or to continuously perform only partial oxidation reforming.

In reforming the hydrocarbon-based fuel at the flow rate at the completion of start-up, that is, in reforming finally performed in the start-up of the fuel cell system, in other words, in the step c finally performed, steam reforming is preferably performed. In other words, preferably, only a steam reforming reaction is allowed to proceed, and a partial oxidation reforming reaction is not allowed to proceed. This is because the hydrogen concentration in the reformed gas can be relatively high, prior to normal operation which is performed after the completion of start-up. In this case, a reforming catalyst layer that can promote a steam reforming reaction is used.

In reforming hydrocarbon at a small flow rate (a flow rate lower than the flow rate at the completion of start-up), partial oxidation reforming or autothermal reforming is preferably performed. Particularly, at an initial stage, that is, at a point of time when the hydrocarbon-based fuel at a flow rate other than zero is supplied to the reforming catalyst layer for the first time, and during a certain period following this point of time, partial oxidation reforming or autothermal reforming is preferably performed. This is because, by performing reforming which involves a partial oxidation reforming reaction, it is possible to accelerate the temperature increase. In this case, a reforming catalyst layer that can promote a steam reforming reaction and a partial oxidation reforming reaction is preferably used because a steam reforming reaction can be performed at the final stage of reforming, and the hydrogen concentration can be made relatively high.

[Steps e, f, and g]

Further, a step e of supplying the hydrocarbon-based fuel to the reforming catalyst layer to combust the hydrocarbon-based fuel may be performed in the step a, using a reforming catalyst layer that can promote combustion in addition to a reforming reaction. In other words, the temperature of the reforming catalyst layer may be increased by combustion in the reforming catalyst layer. Also in this case, it is preferred to perform a step f of measuring the temperature of the reforming catalyst layer, and calculating the flow rate of the hydrocarbon-based fuel that can be combusted in the reforming catalyst layer, based on the measured temperature, prior to the step e, and it is preferred to supply the hydrocarbon-based fuel at the calculated flow rate to the reforming catalyst layer to perform combustion because combustion can be more reliably performed. The flow rate at this time may be lower than the flow rate of the hydrocarbon-based fuel at the completion of start-up.

Also, it is preferred to perform a step g of supplying an oxygen-containing gas at a flow rate required for the combustion performed in the step e to the reforming catalyst layer prior to the step e. Thus, the combustion in the step e can be more reliably performed.

[Calculation of Flow Rate of Hydrocarbon-Based Fuel that can be Reformed]

The method for calculating the flow rate of the hydrocarbon-based fuel that can be reformed in the reforming catalyst layer, based on the measured temperature of the reforming catalyst layer, in the step b will be described below.

The flow rate of the hydrocarbon-based fuel that can be reformed in the reforming catalyst layer refers to a flow rate such that when the hydrocarbon-based fuel at this flow rate is supplied to the reforming catalyst layer, the composition of the gas discharged from the reforming catalyst layer becomes a composition suitable to be supplied to the high temperature fuel cell. Hereinafter, "flow rate of the hydrocarbon-based fuel that can be reformed" is sometimes referred to as "reformable flow rate."

For example, the reformable flow rate in the reforming catalyst layer may be any flow rate equal to or less than the maximum value of a flow rate at which the supplied hydrocarbon-based fuel can be decomposed to a C1 compound (a compound having one carbon atom). In other words, the reformable flow rate in the reforming catalyst layer may be any flow rate equal to or less than the maximum value of the flow rate of the hydrocarbon-based fuel supplied to the reforming catalyst layer when reforming can proceed in the reforming catalyst layer until a composition is obtained in which the concentration of a C2+ component (a component having two or more carbon atoms) in the gas at the outlet of the reforming catalyst layer is 0 (zero) mole % on a dry basis. And at this time, it is enough that the gas at the outlet of the reforming catalyst layer is reducing gas. In this case, the hydrocarbon-based fuel is reformed to a C1 component, and the gas at the outlet of the reforming catalyst layer contains no C2+ component, and therefore, this case is preferred in terms of preventing flow blockage due to carbon deposition and anode degradation. Methane is permitted to be contained in the gas at the outlet of the reforming catalyst layer. In the reforming of the hydrocarbon-based fuel, usually, methane remains in the equilibrium theory. Even if carbon is contained in the gas at the outlet of the reforming catalyst layer in the form of methane, CO, or $CO_2$, carbon deposition can be prevented by adding steam as required. When methane is used as the hydrocarbon-based fuel, it is enough that reforming proceeds so that the gas at the outlet of the reforming catalyst layer becomes reducing. Mole % on a dry basis means mole % calculated excluding water (steam).

With respect to the reducing property of the gas at the outlet of the reforming catalyst layer, it is enough that the property is to the extent that if this gas is supplied to the anode, the oxidative degradation of the anode is suppressed. In order to do this, for example, the hydrogen concentration in the gas at the outlet of the reforming catalyst layer may be about 5 mole % on a dry basis.

The reformable flow rate depends on the temperature of the reforming catalyst layer. Therefore, the calculation of the reformable flow rate in the reforming catalyst layer is performed based on the measured temperature of the reforming catalyst layer.

The reformable flow rate in the reforming catalyst layer may be beforehand obtained as a function (represented as rk(T) or simply rk) of a temperature T of the reforming catalyst layer by experiment. Also, it is possible to determine the reformable flow rate by multiplying the function obtained by experiment by a safety factor, or offsetting the temperature to the safe side. The unit of rk(T) is, for example, mol/s.

<Case where there is One Temperature Measurement Point>

Temperature Measurement Position

When there is a single temperature measurement point in the reforming catalyst layer, it is preferred to use preferably a position where the temperature becomes relatively low in the reforming catalyst layer, more preferably a position where the temperature becomes the lowest in the reforming catalyst layer, as the position for the measurement of temperature used for the calculation of the reformable amount, in terms of safe side control. When the reaction heat in the reforming catalyst layer is endothermic, the vicinity of the center of the catalyst layer may be selected as the temperature measurement position. When the reaction heat in the reforming catalyst layer is exothermic, and the temperatures of the end positions are lower than that of the center portion due to heat release, an end of the catalyst layer may be selected as the temperature measurement position. A location where the temperature becomes low may be found by preliminary experiment or simulation.

The reformable flow rate rk(T) may be a function of only the temperature T. But, this is not limiting, and the reformable flow rate rk may be a function having, in addition to the temperature T, a variable, such as the volume of the catalyst layer, or the concentration of the gas component, other than T. In this case, when the reformable flow rate rk is calculated, it is possible to appropriately obtain a variable other than T, and calculate the reformable flow rate rk from the variable other than T, and the measured T.

<Case where there are a Plurality of Temperature Measurement Points>

The point for the measurement of temperature used for the calculation of the reformable flow rate need not be one. Two or more temperature measurement points are preferred to calculate the reformable flow rate in the reforming catalyst layer more accurately. For example, it is possible to measure the inlet temperature and outlet temperature of the reforming catalyst layer and use their average temperature as the above-described reforming catalyst layer temperature T.

Alternatively, for example, it is possible to consider regions $Z_i$; obtained by dividing the reforming catalyst layer into N, wherein N is an integer of 2 or more, and i is an integer of 1 or more and N or less, find the temperature $T_i$ of each divided region $Z_i$, calculate a reformable flow rate $rk_i(T_i)$ in each divided region from each temperature $T_i$, and calculate a value obtained by summing the reformable flow rates $rk_i(T_i)$, as the reformable flow rate rk in the reforming catalyst layer.

When N divided regions $Z_i$ are considered, reformable flow rates of all divided regions may be summed, or a total of one or more reformable flow rates of only one or some (not all) regions among the N divided regions may be used as the reformable flow rate rk in the reforming catalyst layer. The catalyst layer regions for summation may be appropriately changed according to the feed rate of the hydrocarbon-based fuel. For example, when it is beforehand known that the catalyst layer is heated from the upstream side, the catalyst layer regions for summation may be increased from the upstream side each time the flow rate increases.

As the temperature of the divided region $Z_i$, actually measured temperature may be used as it is, but a calculated value, such as the average value of the inlet temperature and outlet temperature of the divided region, may be appropriately used as a representative value.

Also, it is not necessary to measure temperatures for all divided regions $Z_i$. Also, the number of divisions of the catalyst layer, N, and the number of temperature measurement point(s) may be independently set.

It is also possible to measure temperature(s) of one or some (not all) of the N divided regions and find temperature(s) of the remaining divided region(s) by appropriately complementing from the measured temperature(s).

For example, as a temperature of a divided region where no temperature sensor is installed, a temperature of a divided region nearest to this divided region may be used. When there are two nearest divided regions, a temperature of either of the two divided regions may be used, or the average value of temperatures of the two divided regions may be used.

It is also possible to measure temperatures at a plurality of points in the reforming catalyst layer (at different positions along the gas flow direction), independently of the divided regions, and find a temperature of each divided region from the measured temperatures at the plurality of points. For example, it is possible to measure temperatures of the inlet and outlet of the reforming catalyst layer (a temperature of any position in the middle portion may be further measured), interpolate the temperature of the reforming catalyst layer from these measured temperatures by approximation method, such as least squares method, and find temperatures of the divided regions from the interpolation curve.

Examples of Positions for Measurement of Temperature Used for Calculation of Reformable Flow Rate In order to find temperatures of all divided regions, temperatures of the following positions may be measured.

The inlet and outlet of each divided region.

The interior of each divided region (inner side of the inlet and the outlet) (one point or a plurality of points).

The inlet, outlet, and interior (one point or a plurality of points for one divided region) of each divided region.

In order to find a temperature of one or some (not all) of the divided regions, temperatures of the following positions may be measured.

The inlet and outlet of one or some (not all) of the divided regions.

The interior (one point or a plurality of points) of one of some (not all) of the divided regions (inner side of the inlet and the outlet).

The inlet, outlet, and interior (one point or a plurality of points for one divided region) of one of some (not all) of the divided regions.

[Calculation of Flow Rate of Hydrocarbon-Based Fuel that can be Combusted]

The method for calculating the flow rate of the hydrocarbon-based fuel that can be combusted in the reforming catalyst layer, based on the measured temperature of the reforming catalyst layer, in the step f will be described below.

The flow rate of the hydrocarbon-based fuel that can be combusted in the reforming catalyst layer is any flow rate equal to or less than the maximum value of a flow rate such that when the hydrocarbon-based fuel at this flow rate is supplied to the reforming catalyst layer, this hydrocarbon-based fuel can combust completely in the reforming catalyst layer. Hereinafter, "flow rate of the hydrocarbon-based fuel that can be combusted" is sometimes referred to as "combustible flow rate."

<Case where there is One Temperature Measurement Point>

The combustible flow rate depends on the temperature of the reforming catalyst layer. Therefore, the calculation of the combustible flow rate in the reforming catalyst layer is performed based on the measured temperature of the reforming catalyst layer.

The combustible flow rate in the reforming catalyst layer may be beforehand obtained as a function (represented as ck(T) or simply ck) of the temperature T of the reforming catalyst layer by experiment. Also, it is possible to determine the combustible flow rate by multiplying the function obtained by experiment by a safety factor, or offsetting the temperature to the safe side. The unit of ck(T) is, for example, mol/s.

Temperature Measurement Position

When there is a single temperature measurement point in the reforming catalyst layer, it is preferred to use preferably a position where the temperature becomes relatively low in the reforming catalyst layer, more preferably a position where the temperature becomes the lowest in the reforming catalyst layer, as the position for the measurement of temperature used for the calculation of the combustible flow rate, in terms of safe side control. For example, when the temperatures of the end positions are lower than that of the center portion due to heat release, an end of the catalyst layer may be selected as the temperature measurement position. A location where the temperature becomes low may be found by preliminary experiment or simulation.

The combustible flow rate ck(T) may be a function of only the temperature T. But, this is not limiting, and the combustible flow rate ck may be a function having, in addition to the temperature T, a variable, such as the volume of the catalyst layer, or the concentration of the gas component, other than T. In this case, when the combustible flow rate ck is calculated, it is possible to appropriately obtain a variable other than T, and calculate the combustible flow rate ck from the variable other than T, and the measured T.

<Case where there are Plurality of Temperature Measurement Points>

The point for the measurement of temperature used for the calculation of the combustible flow rate need not be one. Two or more temperature measurement points are preferred to calculate the flow rate of the hydrocarbon-based fuel that can be combusted more accurately. For example, it is possible to measure the inlet temperature and outlet temperature of the reforming catalyst layer and use their average temperature as the above-described reforming catalyst layer temperature T.

Alternatively, for example, it is possible to consider regions $Z_i$ obtained by dividing the reforming catalyst layer into N, wherein N is an integer of 2 or more, and i is an integer of 1 or more and N or less, find the temperature $T_i$ of each divided region $Z_i$, calculate a combustible flow rate $ck_i(T_i)$ in each divided region from each temperature $T_i$, and calculate a value obtained by summing the combustible flow rates $ck_i(T_i)$, as the combustible flow rate ck in the reforming catalyst layer.

The number of divisions N, the regions $Z_i$, and the temperatures $T_i$ considered here may be respectively the same as or different from the number of divisions, the regions, the temperatures used in the calculation of the reformable flow rate.

When N divided regions Z are considered, combustible flow rates of all divided regions may be summed, or a total of one or more combustible flow rates of only one or some (not all) regions among the N divided regions may be used as the combustible flow rate ck in the reforming catalyst layer. The catalyst layer regions for summation may be appropriately changed according to the feed rate of the hydrocarbon-based fuel. For example, when it is beforehand known that the catalyst layer is heated from the upstream side, the catalyst layer regions for summation may be increased from the upstream side each time the flow rate increases.

As the temperature of the divided region $Z_i$, actually measured temperature may be used as it is, but a calculated value, such as the average value of the inlet temperature and outlet temperature of the divided region, may be appropriately used as a representative value.

Also, it is not necessary to measure temperatures for all divided regions $Z_i$. Also, the number of divisions of the catalyst layer, N, and the number of temperature measurement point(s) may be independently set.

It is also possible to measure temperature(s) of one or some (not all) of the N divided regions and find temperature(s) of the remaining divided region(s) by appropriately complementing from the measured temperature(s), as in the case of the reformable flow rate.

It is also possible to measure temperatures at a plurality of points in the reforming catalyst layer (at different positions along the gas flow direction), independently of the divided regions, and find a temperature of each divided region from the measured temperatures at the plurality of points, as in the case of the reformable flow rate.

Examples of Positions for Measurement of Temperature Used for Calculation of Combustible Flow Rate Positions similar to the examples of the positions for the measurement of temperature used for the calculation of the reformable flow rate may be mentioned for both examples of temperature measurement positions for finding the temperatures of all divided regions, and examples of temperature measurement positions for finding the temperature(s) of one or some (not all) of divided regions.

More specific embodiments of the present invention will be described below, using drawings, but the present invention is not limited thereto.

Embodiment 1-1

Here, autothermal reforming is performed at all stages of reforming during start-up. In this case, the reforming reaction is an overall exothermic reaction (heat generation by a partial oxidation reforming reaction is larger than endothermic heat of a steam reforming reaction) to accelerate the increase of the temperature of the reforming catalyst layer and further an SOFC, using the reforming reaction heat.

A reforming catalyst layer that can promote a partial oxidation reforming reaction and a steam reforming reaction is used.

Figure 1:
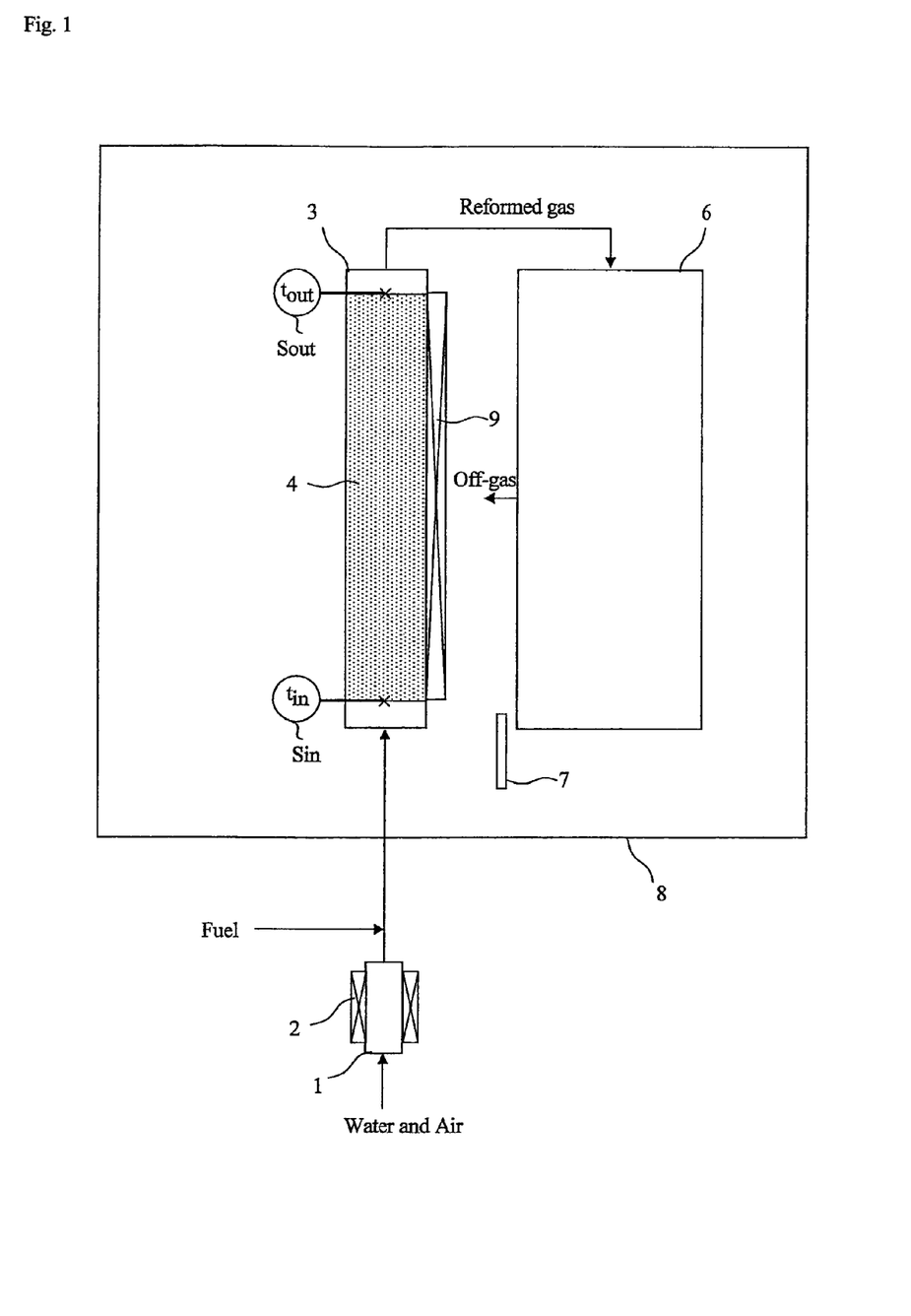
FIG. 1 is a schematic diagram showing the outline of an embodiment of an indirect internal reforming SOFC system.

An SOFC system shown in FIG. 1 includes an indirect internal reforming SOFC in which a reformer 3 and an SOFC 6 are housed in an enclosure (module container) 8. The reformer 3 is equipped with a reforming catalyst layer 4 and also an electrical heater 9.

Also, this SOFC system includes a water vaporizer 1 equipped with an electrical heater 2. The water vaporizer 1 generates steam by heating with the electrical heater 2. The steam may be supplied to the reforming catalyst layer after being appropriately superheated in the water vaporizer or downstream thereof.

Also, air is supplied to the reforming catalyst layer, and here, air can be supplied to the reforming catalyst layer after being preheated in the water vaporizer. Steam or a mixed gas of air and steam can be obtained from the water vaporizer.

The steam or the mixed gas of air and steam is mixed with a hydrocarbon-based fuel and supplied to the reformer 3, particularly to the reforming catalyst layer 4 of the reformer 3. When a liquid fuel, such as kerosene, is used as the hydrocarbon-based fuel, the hydrocarbon-based fuel may be supplied to the reforming catalyst layer after being appropriately vaporized.

A reformed gas obtained from the reformer is supplied to the SOFC 6, particularly to the anode of the SOFC 6. Although not shown, air is appropriately preheated and supplied to the cathode of the SOFC.

Combustible components in an anode off-gas (a gas discharged from the anode) are combusted by oxygen in a cathode off-gas (cathode off-gas) at the SOFC outlet. In order to do this, ignition using an igniter 7 is possible. The outlets of both the anode and the cathode open in the module container.

Here, a thermocouple is used as the temperature sensor. A thermocouple $S_{in}$ is disposed at the inlet of the catalyst layer 4, and a thermocouple $S_{out}$ is disposed at the outlet of the catalyst layer.

With respect to a water flow rate, in order to suppress carbon deposition, preferably, the water flow rate is increased with the increase of the fuel flow rate, so that a predetermined value of S/C (the ratio of the number of moles of water molecules to the number of moles of carbon atoms in the gas supplied to the reforming catalyst layer) is maintained. With respect to an air flow rate, desirably, the air flow rate is increased with the increase of the fuel flow rate, so that the reforming reaction is an overall exothermic reaction.

This system can be actually started up by procedure shown below.

1. The temperature of the water vaporizer 1 is increased to a temperature at which water can vaporize, by the electrical heater 2 provided for the water vaporizer. At this time, nothing is supplied to the reforming catalyst layer 4.

2. The temperature of the reforming catalyst layer is increased by the electrical heater 9. The temperature monitoring by the thermocouples $S_{in}$ and $S_{out}$ is also started.

3. (Step b) Temperatures $t_{in}$ and $t_{out}$ respectively measured by the thermocouples $S_{in}$ and $S_{out}$ are averaged to obtain a temperature T of the reforming catalyst layer ($T=(t_{in}+t_{out})/2$). Then, the reformable flow rate rk(T) is calculated using this T.

4. Water is supplied to the water vaporizer 1 and vaporized, and the obtained steam is supplied to the reforming catalyst layer 4. Here, the flow rate of the supplied water is a value calculated from rk calculated in the step 3, and beforehand determined S/C. When rk calculated in the first-time step 3 is 0, the flow rate of water to the water vaporizer may be 0. In other words, steam need not be supplied to the reforming catalyst layer. Alternatively, even if rk calculated in the first-time step 3 is 0, water at any flow rate may be supplied to the water vaporizer, for example, to heat the reforming catalyst layer by the sensible heat of steam. In this case, for example, the flow rate of water supplied to the water vaporizer may be the lowest value of a flow rate at which water can be stably supplied by a pressure increasing means for supplying water.

5. Air is supplied to the reforming catalyst layer 4. Here, the flow rate of the supplied air is a value calculated from rk calculated in the step 3, and beforehand determined $O_2/C$. When rk calculated in the first-time step 3 is 0, the flow rate of air may be 0. In other words, air need not be supplied to the reforming catalyst layer. Alternatively, even if rk calculated in the first-time step 3 is 0, air at any flow rate may be supplied to the reforming catalyst layer, for example, to heat the reforming catalyst layer by the sensible heat of air (preheated air). In this case, for example, the flow rate of air supplied to the reforming catalyst layer may be the lowest value of a flow rate at which air can be stably supplied by a pressure increasing means for supplying air.

The reforming catalyst layer is also heated by the sensible heat of the steam and air.

6. (Step c) The hydrocarbon-based fuel is supplied at flow rate rk to the reforming catalyst layer and reformed, and the obtained reformed gas is supplied to the SOFC anode.

When the reformed gas is supplied to the SOFC anode, an anode off-gas (here, the reformed gas as it is) is discharged from the anode. Since the anode off-gas is combustible, the anode off-gas may be ignited using the igniter 7, and combusted. The reforming catalyst layer is also heated by this combustion heat. This is preferred for accelerating temperature increase.

After autothermal reforming is started in the reforming catalyst layer, the reforming catalyst layer is also heated by heat generation by the reforming reaction, in addition to the heat generation of the electrical heater 9 and the sensible heat of the steam and preheated air. In the case of an indirect internal reforming SOFC system, when the anode off-gas is combusted, the reforming catalyst layer can also be heated using the combustion heat. In the cases of SOFC systems other than the indirect internal reforming SOFC system, for example, a combustion gas generated by combusting the anode off-gas by appropriate combustion means may be supplied to the periphery of the reformer to heat the reforming catalyst layer. These are preferred for accelerating temperature increase.

The flow rate of the hydrocarbon-based fuel supplied to the reforming catalyst layer may be increased up to the flow rate of the hydrocarbon-based fuel at the completion of start-up, while the steps 3 to 6 are repeated. However, the supply of the hydrocarbon-based fuel to the reforming catalyst layer in the step c is not performed until rk calculated in the step 3 (step b) exceeds zero.

When the temperatures of the reformer and the SOFC are increased to predetermined temperatures, the start-up of the SOFC system can be completed.

The SOFC may be heated by the sensible heat of the reformed gas obtained from the reformer and also by the combustion heat of the anode off-gas. When the fuel cell has started electric power generation, the SOFC is also heated by heat generation by the cell reaction.

When air at a flow rate higher than an air flow rate at the time of rating is supplied to the reforming catalyst layer at a point of time when the last-time step c is completed, the air flow rate may be decreased to the rated flow rate, while the reforming catalyst layer is maintained at a temperature at which the hydrocarbon-based fuel at a flow rate supplied in the last step c can be reformed. For example, in the last step c, air at a flow rate higher than the air flow rate at the time of rating may be supplied to make the reforming reaction an overall exothermic reaction, and at the time of rating, the air flow rate may be decreased (including becoming zero) to obtain a reformed gas having a higher hydrogen concentration, mainly using a steam reforming reaction. At the time of rating, the reforming reaction is an overall endothermic reaction, and the reformer can be heated by the combustion heat of the anode off-gas (also radiant heat from the SOFC, in addition to this, during electric power generation). Here, the flow rate of air supplied to the cathode, the hydrocarbon-based fuel flow rate, the water flow rate, and an electric current value when electric current is passed through the SOFC may be increased or decreased in order to maintain the reforming catalyst layer at the temperature at which the hydrocarbon-based fuel at the flow rate supplied in the last step c can be reformed.

By starting up the SOFC system in the above-described manner, first, a reforming raw material at a relatively lower flow rate can be introduced, and a reducing reformed gas can be supplied to the SOFC. Therefore, it is easy to reduce the heat amount required for heating the catalyst layer, and it is easy to reduce the time until the generation of the reformed gas. It is effective that the reducing gas becomes available early, also for preventing the oxidative degradation of the anode.

In the example described above, autothermal reforming is performed, and partial oxidation reforming reaction heat is used as heat for heating the reforming catalyst layer. Therefore, the size and the power supply capacity of the electrical heater can be made smaller, the size of the indirect internal reforming SOFC module can be made more compact, and its structure can be made simpler, compared with a case where the reforming catalyst layer is heated only by the heat generation of the electrical heater and a steam reforming reaction is performed. An SOFC module is one in which at least an SOFC is housed in an enclosure (module container), and the required piping may be housed in the enclosure. In an indirect internal reforming SOFC module, a reformer may also be housed in the enclosure.

In the present embodiment, the electrical heater 9 is used to increase the temperature of the reforming catalyst layer, but when the catalyst layer is sufficiently heated by sensible heat of steam and air, the electrical heater 9 need not be used.

The start of the heating of the reforming catalyst layer by the electrical heater 9 is preferably performed from a point of time as early as possible to reduce time for the temperature increasing. The temperature of the reforming catalyst layer may be increased by the electrical heater 9 without waiting for the completion of the step (step 1) of increasing the temperature of the water vaporizer to a temperature at which water can vaporize, by the electrical heater 2. The electrical heater 2 for heating the water vaporizer and the electrical heater 9 for heating the reforming catalyst layer may be simultaneously turned on.

In the present embodiment, the heat generation of the electrical heater 2 is used for water vaporization, but this it not limiting. When steam at high temperature is supplied from outside the module, when air at high temperature is supplied from outside the module, and the water vaporizer is sufficiently heated by sensible heat of the air, or the like, the electrical heater 2 need not be used.

Embodiment 1-2

In this embodiment, partial oxidation reforming is performed in the step c, from a point of time when the hydrocarbon-based fuel at a flow rate other than zero is supplied to the reforming catalyst layer for the first time, to a certain point of time in the midstream of start-up operation (a point of time when the hydrocarbon-based fuel increases to a certain flow rate lower than the flow rate at the completion of start-up). It is possible to use, as the certain point of time herein, for example, a point of time when the temperatures of the flow path of the reformed gas and the flow path of its combustion gas are increased to a temperature at which moisture included in the reformed gas does not condense in the module. After that, autothermal reforming is performed in the step c. By performing partial oxidation reforming not using water as a reforming raw material at an initial stage, it is possible to suppress condensation of moisture included in the reformed gas inside the module. In this case, unlike the embodiment 1-1, the step 4 of supplying water to the water vaporizer 1 is not performed at the initial stage (while partial oxidation reforming is performed). The step 1 of increasing the temperature of the water vaporizer 1 by the electrical heater 2 is not performed at the initial stage (while partial oxidation reforming is performed), and the step 1 of increasing the temperature of the water vaporizer 1 by the electrical heater 2 may be performed when performing autothermal reforming.

Embodiment 1-3

Figure 3:
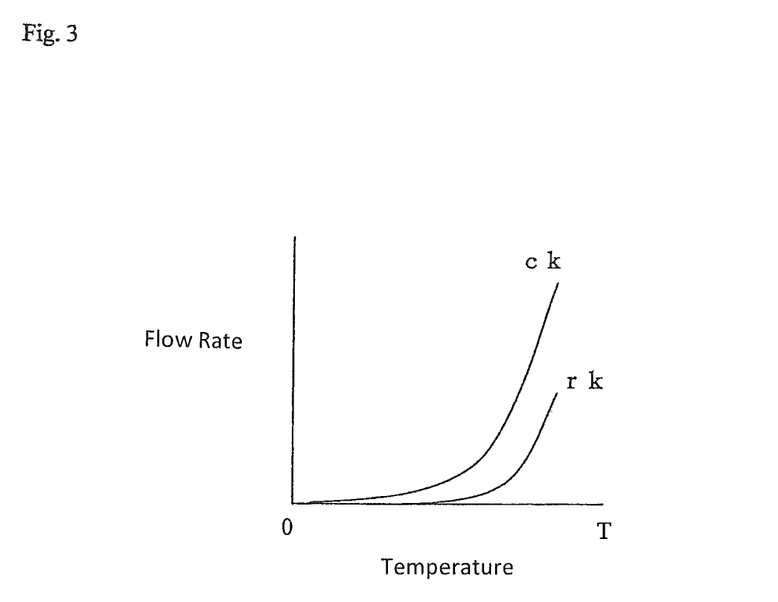
FIG. 3 is a graph conceptually showing the correlation between the temperature of a reforming catalyst layer and a reformable flow rate and a combustible flow rate.

In this embodiment, combustion is performed in the reforming catalyst layer in the step a to accelerate the increase of the temperature of the reforming catalyst layer, using the catalytic combustion heat. FIG. 3 is a graph conceptually showing the correlation between the temperature of the reforming catalyst layer and the reformable flow rate rk and the combustible flow rate ck. Usually, the combustible flow rate ck(T) is larger than the reformable flow rate rk(T), and the value of ck(T) exceeds 0 at a lower temperature. Therefore, it is possible to start combustion at a low temperature, and finish the combustion and start reforming when rk(T) exceeds 0.

After the steps up to the above-described step 2 are performed, temperatures $t_{in}$ and $t_{out}$ respectively measured by the thermocouples $S_{in}$ and $S_{out}$ are averaged to obtain the temperature T of the reforming catalyst layer ($T=(t_{in}+t_{out})/2$) (step 2-1). Then, the combustible flow rate ck for catalytic combustion is calculated using this T (step 2-2). An air flow rate is calculated from the calculated ck and beforehand determined $O_2/C$, and air at this flow rate is supplied to the reforming catalyst layer (step 2-3). The hydrocarbon-based fuel at the flow rate ck is supplied to the catalyst layer (step 2-4) to start catalytic combustion. Then, the above-described step 3 is performed. The steps 2-1 to 2-4 and the step 3 are repeated to increase the hydrocarbon-based fuel to be catalytically combusted, and when rk calculated in the step 3 exceeds zero, the supply of the hydrocarbon-based fuel is stopped (step 2-5), and the supply of air is stopped (step 2-6) to finish the catalytic combustion. Then, the step 4 and the subsequent steps are performed, and reforming is started in the first-time step 6.

It is possible to beforehand determine a hydrocarbon-based fuel flow rate rk0 supplied in the first-time step 6, repeat the steps 2-1 to 2-4 to increase the hydrocarbon-based fuel to be catalytically combusted to rk0 and maintain rk0, then perform the step 3, and perform the step 4 and the subsequent steps when the calculated rk becomes rk0 or more. In this case, in the first-time step 5, the flow rate of air supplied to the reforming catalyst layer is decreased from a flow rate required for catalytic combustion to a flow rate required for autothermal reforming to finish catalytic combustion and simultaneously start reforming.

The above rk0 may be a certain flow rate lower than the hydrocarbon-based fuel flow rate at the completion of start-up. For example, this flow rate may be a flow rate equal to or less than a hydrocarbon-based fuel flow rate at which the combustion gas flows through the fuel cell to result in a temperature at which the fuel cell is degraded.

Alternatively, it is possible to repeat the steps 2-1 to 2-2, perform the steps 2-3 and 2-4, when the calculated ck exceeds rk0, to start catalytic combustion, repeatedly perform the step 3, and perform the step 4 and the subsequent steps when rk calculated in the step 3 becomes rk0 or more. Also in this case, in the first-time step 5, the flow rate of air supplied to the reforming catalyst layer is decreased from the flow rate required for catalytic combustion to the flow rate required for autothermal reforming to finish catalytic combustion and simultaneously start reforming.

Embodiment 2-1

In this embodiment, a plurality of divided regions into which the reforming catalyst layer is segmented along the gas flow direction are considered. In step a, temperatures at a plurality of points which locate at different positions along the gas flow direction in the reforming catalyst layer are measured. In step b, flow rate(s) of the hydrocarbon-based fuel that can be reformed in one or more of the above plurality of divided regions are calculated, based on these temperatures at the plurality of points. The total value of the calculated flow rate(s) is determined as the flow rate of the hydrocarbon-based fuel that can be reformed in the reforming catalyst layer. Of course, in case that the flow rate of the hydrocarbon-based fuel that can be reformed in only one divided region is calculated, this flow rate is the above total value.

Figure 2:
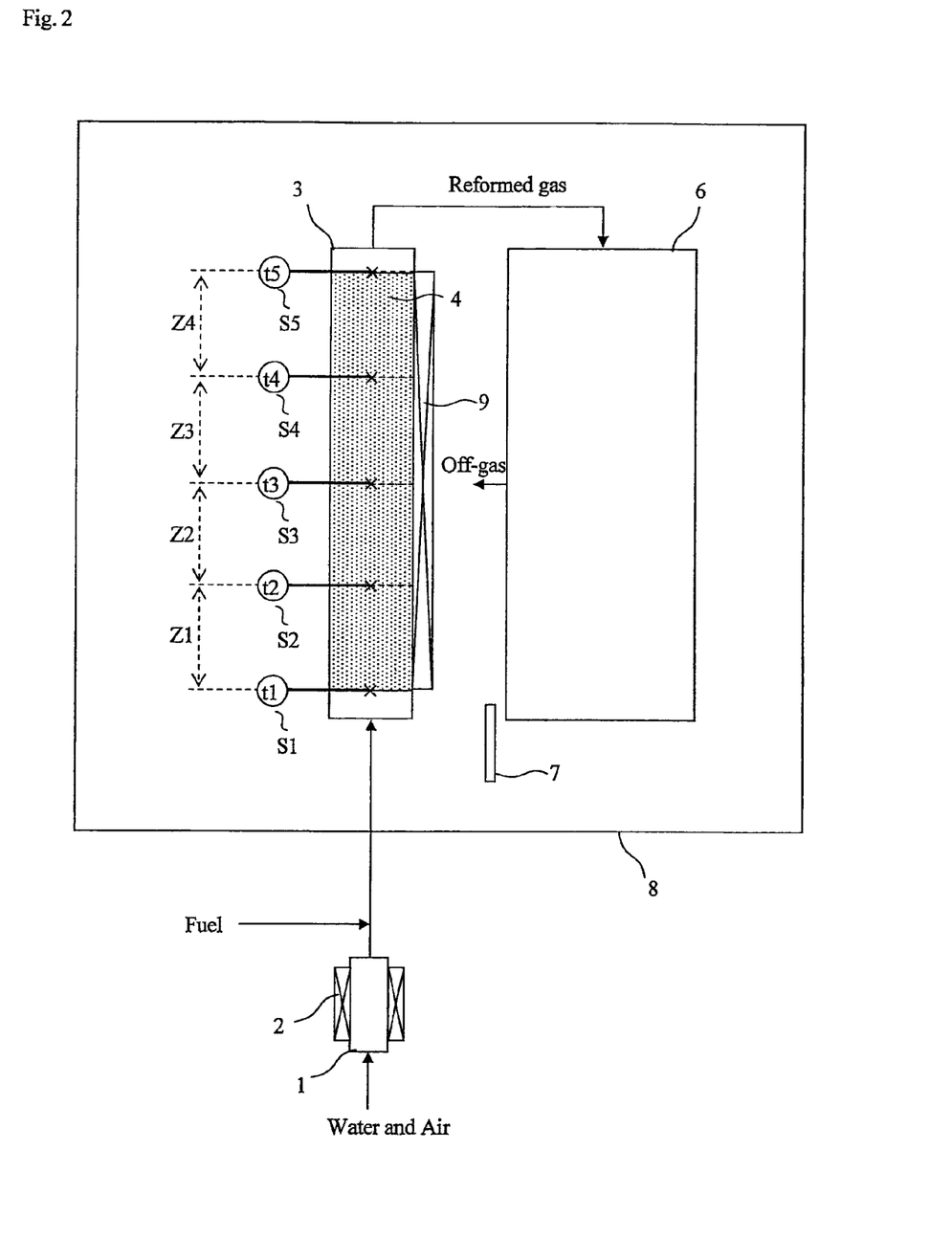
FIG. 2 is a schematic diagram showing the outline of another embodiment of the indirect internal reforming SOFC system.

As shown in FIG. 2, divided regions $Z_1$ to $Z_4$ obtained by dividing the reforming catalyst layer into four are considered. Catalyst layer heights of the divided regions are equal to each other. Thermocouples are provided at the inlet and outlet of the reforming catalyst layer, and the borders between the divided regions, respectively ($S_1$ to $S_5$). Temperatures measured by the thermocouples $S_1$ to $S_5$ are respectively represented as $t_1$ to $t_5$.

The temperature $T_i$ of each divided region $Z_i$ is obtained from $T_i=(t_i+t_{i+1})/2$, wherein i=1, 2, 3, and 4.

A reformable flow rate $rk_i(T_i)$ in each divided region $Z_i$ is calculated from this $T_i$, and a value obtained by summing the reformable flow rates $rk_i(T_i)$ is determined as the reformable flow rate rk in the reforming catalyst layer. $rk_i(T_i)$ may be beforehand obtained by experiment.

The fuel cell system can be started up as in embodiment 1-1, except the above.

[Fuel Cell System]

Figure 4:
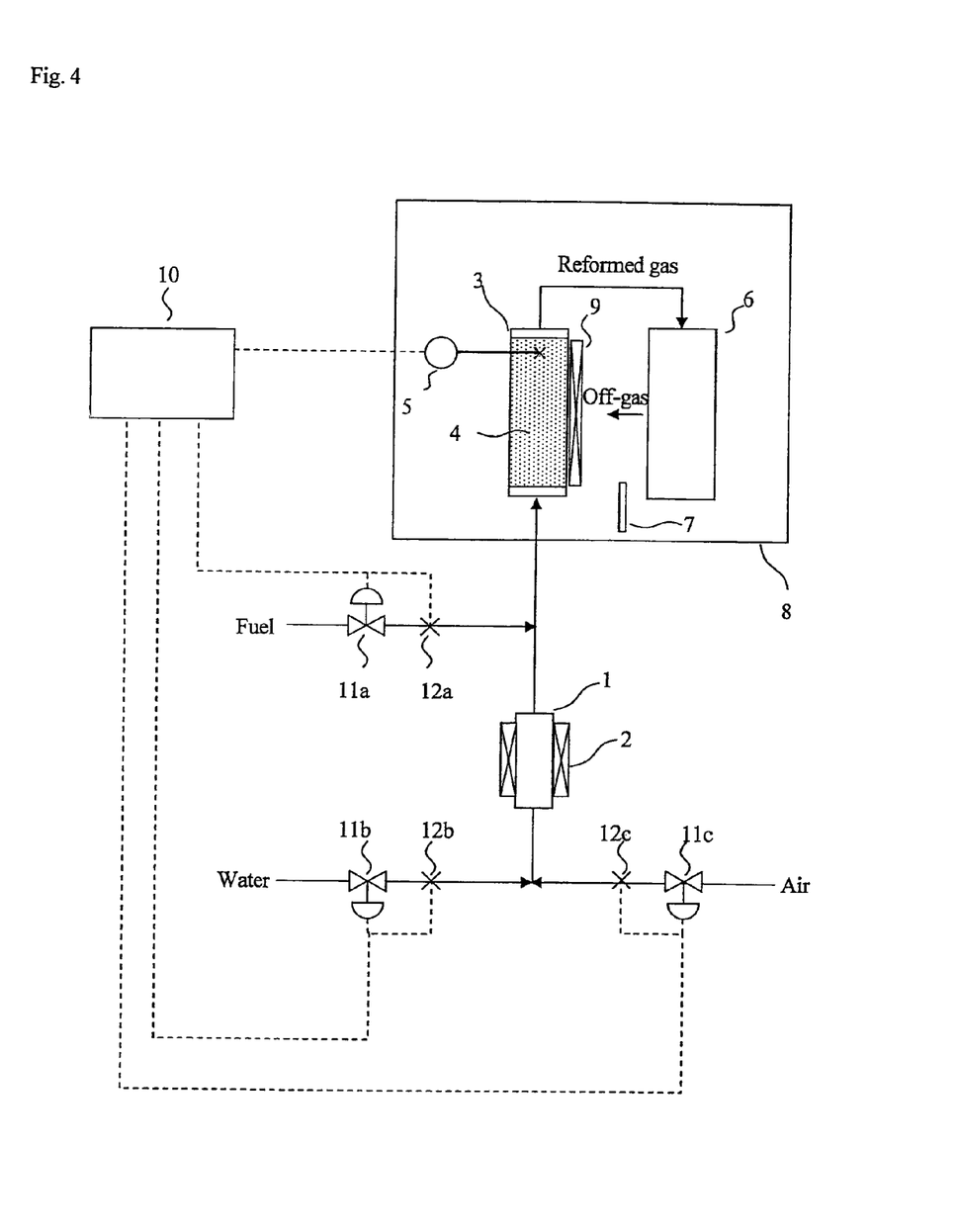
FIG. 4 is a schematic diagram showing the outline of a further embodiment of the indirect internal reforming SOFC system.

One embodiment of a fuel cell system that can be preferably used to perform the above method will be described using FIG. 4.

This fuel cell system includes:

a reformer 3 having a reforming catalyst layer 4, for reforming a hydrocarbon-based fuel to produce a hydrogen-containing gas;

a high temperature fuel cell (SOFC 6) for generating electric power using the hydrogen-containing gas;

a reforming catalyst layer temperature measuring means (thermocouple 5) for measuring a temperature of the reforming catalyst layer;

a reforming catalyst layer temperature increasing means (electrical heater 9) for increasing a temperature of the reforming catalyst layer; and a controlling means.

This control means has a fuel flow rate calculating function for calculating the flow rate of the hydrocarbon-based fuel that can be reformed in the reforming catalyst layer, based on the measured temperature of the reforming catalyst layer, and a fuel flow rate controlling function for controlling the hydrocarbon-based fuel supplied to the reforming catalyst layer to flow at the calculated flow rate. This control means can increase the feed rate of the hydrocarbon-based fuel to the reforming catalyst layer, while repeatedly operating the above fuel flow rate calculating function and the above fuel flow rate controlling function, until the feed rate of the hydrocarbon-based fuel to the reforming catalyst layer becomes a flow rate at the completion of start-up. The control means may include, for example, a computer 10, a flowmeter, and a flow rate control valve.

A flowmeter 12a and a flow rate control valve 11a for the hydrocarbon-based fuel may be used to control the feed rate of the hydrocarbon-based fuel to the reforming catalyst layer. In this case, a flow rate signal is input to the computer 10 from the flowmeter 12a, and this computer may output to the flow rate control valve 11a an opening degree signal, which is calculated by an appropriate method, such as an PID calculation, so that the present value of the flow rate, and a reformable flow rate calculated by the computer 10 become equal. Alternatively, a mass flow controller for the hydrocarbon-based fuel may be used instead of the flowmeter 12a and the flow rate control valve 11a, though not shown. In this case, the computer 10 may convert a calculated reformable flow rate to a signal and output the signal to the mass flow controller. Alternatively, pressurization means, such as a pump or a blower, for the hydrocarbon-based fuel that can change the flow rate according to the input signal may be used instead of the flow rate control valve 11a, though not shown. In this case, a flow rate signal is input to the computer 10 from the flowmeter 12a, and this computer may output to the pressurization means a flow rate signal, which is calculated by an appropriate method, such as an PID calculation, so that the present value of the flow rate, and a reformable flow rate calculated by the computer 10 become equal.

The control means may control one or both of the steam flow rate and the oxygen-containing gas flow rate, as required. A flowmeter 12b and a flow rate control valve 11b for water may be used for the control of the flow rate of the steam. Alternatively, a pump for water that can change the flow rate according to the input signal, or a mass flow controller for water may be used, though not shown. A flowmeter 11c and a flow rate control valve 12c for air may be used for the control of the flow rate of the oxygen-containing gas. Alternatively, a blower for air that can change the flow rate according to the input signal, or a mass flow controller for air may be used, though not shown. With respect to the control of the flow rate of the hydrocarbon-based fuel, the steam, and the oxygen-containing gas, the flow rate may be controlled, with these in the state of gas, and in some cases, the flow rate may be controlled, with these in the state of liquid before being vaporized.

Also, the control means may calculate the required flow rate of one or both of the steam and the oxygen-containing gas, as required.

[Hydrocarbon-Based Fuel]

It is possible to use a hydrocarbon-based fuel appropriately selected from compounds of which molecules contain carbon and hydrogen (may also contain other elements, such as oxygen) or mixtures thereof that are publicly known as raw materials of reformed gas in the field of SOFCs. It is possible to use compounds of which molecules contain carbon and hydrogen, such as hydrocarbons and alcohols. For example, hydrocarbon fuels, such as methane, ethane, propane, butane, natural gas, LPG (liquefied petroleum gas), city gas, gasoline, naphtha, kerosene and gas oil, alcohols, such as methanol and ethanol, ethers, such as dimethylether, and the like may be used.

Particularly, kerosene and LPG are preferred because they are readily available. In addition, they can be stored in a stand-alone manner, and therefore, they are useful in areas where the city gas pipeline is not built. Further, an SOFC power generating equipment using kerosene or LPG is useful as an emergency power supply. Particularly, kerosene is preferred because it is easy to handle.

[High Temperature Fuel Cell]

The present invention may be suitably applied to a system equipped with a high temperature fuel cell that requires the prevention of the oxidative degradation of the anode. When a metal electrode is used for the anode, the oxidative degradation of the anode may occur, for example, at about 400° C. Such a fuel cell includes an SOFC and an MCFC.

The SOFC may be appropriately selected for use from publicly known SOFCs having various shapes, such as planar and tubular SOFCs. In the SOFC, generally, an oxygen-ion conductive ceramic or a proton-ion conductive ceramic is used as the electrolyte.

The MCFC may also be appropriately selected for use from publicly known MCFCs.

The SOFC or the MCFC may be a single cell, but practically, a stack in which a plurality of single cells are arrayed (the stack is sometimes referred to as a bundle in the case of a tubular type, and the stack in this specification includes a bundle) is preferably used. In this case, one stack or a plurality of stacks may be used.

[Reformer]

A reformer produces a reformed gas containing hydrogen from a hydrocarbon-based fuel. In the reformer, any of steam reforming, partial oxidation reforming and autothermal reforming in which a steam reforming reaction is accompanied by a partial oxidation reaction may be performed.

In the reformer, a steam reforming catalyst having steam reforming activity, a partial oxidation reforming catalyst having partial oxidation reforming activity, or an autothermal reforming catalyst having both partial oxidation reforming activity and steam reforming activity may be appropriately used.

A hydrocarbon-based fuel (vaporized beforehand as required) and steam, and further an oxygen-containing gas, such as air, as required, may be supplied to the reformer (the reforming catalyst layer), each independently, or appropriately mixed beforehand. The reformed gas is supplied to the anode of the high temperature fuel cell.

Among high temperature fuel cells, an indirect internal reforming SOFC is excellent in that the thermal efficiency of the system can be increased. The indirect internal reforming SOFC has a reformer for producing a reformed gas containing hydrogen from a hydrocarbon-based fuel using a steam reforming reaction and an SOFC. In this reformer, a steam reforming reaction may be performed, and autothermal reforming in which a steam reforming reaction is accompanied by a partial oxidation reaction may be performed. In terms of the electric power generation efficiency of the SOFC, preferably, no partial oxidation reaction occurs after the completion of start-up. The autothermal reforming is designed so that steam reforming is predominant after the completion of start-up, and therefore, the reforming reaction is an overall endothermic reaction. Heat required for the reforming reaction is supplied from the SOFC. The reformer and the SOFC are housed in one module container and modularized. The reformer is disposed at a position where it receives thermal radiation from the SOFC. Thus, the reformer is heated by thermal radiation from the SOFC during electric power generation. Also, the SOFC may be heated by combusting the anode off-gas, which is discharged from the SOFC, at the cell outlet.

In the indirect internal reforming SOFC, the reformer is preferably disposed at a position where radiation heat can be directly transferred from the SOFC to the outer surface of the reformer. Therefore, it is preferred that there is substantially no obstacle between the reformer and the SOFC, that is, it is preferred to make the region between the reformer and the SOFC be an empty space. Also, the distance between the reformer and the SOFC is preferably as short as possible.

Each supply gas is supplied to the reformer or the SOFC, after being appropriately preheated as required.

The module container may be any appropriate container capable of housing the SOFC and the reformer. An appropriate material having resistance to the environment used, for example, stainless steel, may be used as the material of the container. A connection port is appropriately provided for the container for gas interfacing or the like.

Particularly when the cell outlet opens in the module container, the module container is preferably hermetic in order to prevent communication between the interior of the module container and the surroundings (atmosphere).

[Reforming Catalyst]

A publicly known catalyst may be used for each of the steam reforming catalyst, the partial oxidation reforming catalyst and the autothermal reforming catalyst used in the reformer. Examples of the partial oxidation reforming catalyst include a platinum-based catalyst. Examples of the steam reforming catalyst include ruthenium-based and nickel-based catalysts. Examples of the autothermal reforming catalyst include a rhodium-based catalyst. Examples of the reforming catalyst that can promote combustion include platinum-based and rhodium-based catalysts.

A temperature at which the partial oxidation reforming reaction can proceed is, for example, 200° C. or more. The temperature at which the steam reforming reaction can proceed is, for example, 400° C. or more.

The conditions during start-up and during rated operation of the reformer for each of steam reforming, autothermal reforming, and partial oxidation reforming will be described below.

In steam reforming, steam is added to a reforming raw material, such as kerosene. The reaction temperature of the steam reforming may be in the range of, for example, 400° C. to 1000° C., preferably 500° C. to 850° C., and further preferably 550° C. to 800° C. An amount of the steam introduced into the reaction system is defined as a ratio of the number of moles of water molecules to the number of moles of carbon atoms contained in the hydrocarbon-based fuel (steam/carbon ratio). This value is preferably 1 to 10, more preferably 1.5 to 7, and further preferably 2 to 5. When the hydrocarbon-based fuel is liquid, a space velocity (LHSV) can be represented as A/B, wherein a flow velocity of the hydrocarbon-based fuel in a liquid state is represented as A (L/h), and a volume of the catalyst layer is represented as B (L). This value is set in the range of preferably 0.05 to 20 $h^{-1}$, more preferably 0.1 to 10 $h^{-1}$, and further preferably 0.2 to 5 $h^{-1}$.

In autothermal reforming, in addition to the steam, an oxygen-containing gas is added to the reforming raw material. The oxygen-containing gas may be pure oxygen, but in terms of the ease of availability, air is preferred. The oxygen-containing gas may be added so that the endothermic reaction accompanying the steam reforming reaction is balanced, and an amount of heat generation such that the temperature of the reforming catalyst layer and the SOFC can be maintained or increased is obtained. With respect to the amount of the oxygen-containing gas added, a ratio of the number of moles of oxygen molecules to the number of moles of carbon atoms contained in the hydrocarbon-based fuel (oxygen/carbon ratio) is preferably 0.005 to 1, more preferably 0.01 to 0.75, and further preferably 0.02 to 0.6. A reaction temperature of the autothermal reforming reaction is set in the range of, for example, 400° C. to 1000° C., preferably 450° C. to 850° C., and further preferably 500° C. to 800° C. When the hydrocarbon-based fuel is liquid, the space velocity (LHSV) is selected in the range of preferably 0.05 to 20 $h^{-1}$, more preferably 0.1 to 10 $h^{-1}$, and further preferably 0.2 to 5 $h^{-1}$. With respect to an amount of the steam introduced into the reaction system, the steam/carbon ratio is preferably 1 to 10, more preferably 1.5 to 7, and further preferably 2 to 5.

In partial oxidation reforming, an oxygen-containing gas is added to the reforming raw material. The oxygen-containing gas may be pure oxygen, but in terms of the ease of availability, air is preferred. An amount of the oxygen-containing gas added is appropriately determined in terms of heat loss and the like to ensure a temperature at which the reaction proceeds. With respect to this amount, the ratio of the number of moles of oxygen molecules to the number of moles of carbon atoms contained in the hydrocarbon-based fuel (oxygen/carbon ratio) is preferably 0.1 to 3 and more preferably 0.2 to 0.7. A reaction temperature of the partial oxidation reaction may be set in the range of, for example, 450° C. to 1000° C., preferably 500° C. to 850° C., and further preferably 550° C. to 800° C. When the hydrocarbon-based fuel is liquid, a space velocity (LHSV) is selected in the range of preferably 0.1 to 30 $h^{-1}$. Steam can be introduced into the reaction system to suppress the generation of soot, and with respect to an amount of the steam, the steam/carbon ratio is preferably 0.1 to 5, more preferably 0.1 to 3, and further preferably 1 to 2.

[Other Equipment]

In the fuel cell system used in the present invention, publicly known components of a high temperature fuel cell system may be appropriately provided as required. Specific examples of the publicly known components include a desulfurizer for reducing a sulfur content of a hydrocarbon-based fuel; a vaporizer for vaporizing a liquid; pressure increasing means for pressurizing various fluids, such as a pump, a compressor, and a blower; flow rate controlling means or flow path blocking/switching means for controlling the flow rate of a fluid, or blocking/switching the flow of a fluid, such as a valve; a heat exchanger for performing heat exchange and heat recovery; a condenser for condensing a gas; heating/warming means for externally heating various equipment with steam or the like; storage means of a hydrocarbon-based fuel and combustibles; an air or electrical system for instrumentation; a signal system for control; a control device; and an electrical system for output and powering; and the like.

INDUSTRIAL APPLICABILITY

The present invention can be applied to a high temperature fuel cell system used for, for example, a stationary or mobile electric power generation system and a cogeneration system.

The invention claimed is:

1. A method for starting up a fuel cell system comprising a reformer having a reforming catalyst layer, for reforming a hydrocarbon-based fuel to produce a hydrogen-containing gas, and a high temperature fuel cell for generating electric power using the hydrogen-containing gas, comprising:

a) increasing a temperature of the reforming catalyst layer, while measuring the temperature of the reforming catalyst layer;

b) calculating a flow rate of the hydrocarbon-based fuel that can be reformed in the reforming catalyst layer, based on the measured temperature of the reforming catalyst layer; and
c) supplying the hydrocarbon-based fuel at the calculated flow rate to the reforming catalyst layer to reform the hydrocarbon-based fuel, and supplying the obtained reformed gas to an anode of the high temperature fuel cell,
wherein a feed rate of the hydrocarbon-based fuel to the reforming catalyst layer is increased, while steps b and c are repeated, until the feed rate of the hydrocarbon-based fuel to the reforming catalyst layer becomes the flow rate at completion of start-up.

2. The method according to claim 1, further comprising
d) supplying one or both of steam and an oxygen-containing gas at a flow rate required for the reforming performed in step c to the reforming catalyst layer prior to step c.

3. The method according to claim 1,
wherein a plurality of divided regions into which the reforming catalyst layer is divided along a gas flow direction are considered,
in step a, temperatures at a plurality of points in the reforming catalyst layer at different positions along the gas flow direction are measured, and
in step b, one or more flow rates of the hydrocarbon-based fuel that can be reformed in one or more of the plurality of divided regions are calculated, based on the temperatures at the plurality of points, and a total value of the calculated flow rates is determined as said flow rate of the hydrocarbon-based fuel that can be reformed in the reforming catalyst layer.

4. The method according to claim 1,
wherein as the reforming catalyst layer, a reforming catalyst layer that can promote a steam reforming reaction is used, and
steam reforming is performed when the hydrocarbon-based fuel at the flow rate at the completion of start-up is reformed.

5. The method according to claim 4,
wherein as the reforming catalyst layer, a reforming catalyst layer that can promote a steam reforming reaction and a partial oxidation reforming reaction is used, and
partial oxidation reforming or autothermal reforming is performed when the hydrocarbon-based fuel at a flow rate lower than the flow rate at the completion of start-up is reformed.

6. The method according to claim 1,
wherein as the reforming catalyst layer, a reforming catalyst layer that can promote combustion is used, and
in step a,
e) supplying the hydrocarbon-based fuel to the reforming catalyst layer to combust the hydrocarbon-based fuel is performed.

7. The method according to claim 6, further comprising
f) calculating a flow rate of the hydrocarbon-based fuel that can be combusted in the reforming catalyst layer, based on the measured temperature of the reforming catalyst layer, prior to step e.

8. The method according to claim 7, further comprising
g) supplying an oxygen-containing gas at a flow rate required for the combustion performed in step e to the reforming catalyst layer prior to step e.

9. The method according to claim 6, wherein step e is stopped prior to when the temperature of the fuel cell reaches an anode oxidative degradation temperature.

* * * * *